US008640833B2

(12) United States Patent
Camilo-Martinez et al.

(10) Patent No.: US 8,640,833 B2
(45) Date of Patent: Feb. 4, 2014

(54) PNEUMATICALLY OR ELECTROMECHANICALLY ACTUATABLE DISC BRAKE

(75) Inventors: Jose Camilo-Martinez, Unterhaching (DE); Matthias Klingner, Moorenweis (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 198 days.

(21) Appl. No.: 13/350,181

(22) Filed: Jan. 13, 2012

(65) Prior Publication Data

US 2012/0132491 A1    May 31, 2012

Related U.S. Application Data

(63) Continuation of application No. PCT/EP2010/060140, filed on Jul. 14, 2010.

(30) Foreign Application Priority Data

Jul. 16, 2009    (DE) .......................... 10 2009 033 394

(51) Int. Cl.
*F16D 55/08*    (2006.01)
(52) U.S. Cl.
USPC ...... 188/71.7; 188/72.9; 188/71.9; 188/196 F
(58) Field of Classification Search
USPC ........ 188/72.5–72.9, 73.1, 71.7–71.9, 196 R, 188/196 F, 196 M, 196 B, 196 BA
See application file for complete search history.

(56) References Cited

U.S. PATENT DOCUMENTS

| 3,592,299 | A | 7/1971 | Erdmann |
| 7,523,814 | B2 | 4/2009 | Macke |
| 7,926,626 | B2 * | 4/2011 | Iraschko .................... 188/196 F |
| 8,327,981 | B2 * | 12/2012 | Giering et al. ............... 188/71.9 |
| 2004/0149527 | A1 | 8/2004 | Norman et al. |

FOREIGN PATENT DOCUMENTS

| DE | 10 2008 036 765 A1 | 2/2010 |
| WO | WO 2006/024511 A1 | 3/2006 |
| WO | WO 2006/111136 A1 | 10/2006 |

OTHER PUBLICATIONS

International Search Report dated Oct. 22, 2010 including English-language translation (Four (4) pages).
International Preliminary Report on Patentability dated Jan. 26, 2012 (seven (7) pages).

* cited by examiner

*Primary Examiner* — Melanie Torres Williams
(74) *Attorney, Agent, or Firm* — Crowell & Moring LLP

(57) ABSTRACT

A pneumatically or electromechanically actuatable disc brake as a wear adjustment adjustment device, which is positioned in a caliper, and is actuatable by a brake lever, includes a central drive element. The central drive element is connected to a drive spindle by way of a ball ramp coupling and the ball ramp coupling has a drive output disc, which engages in the drive element, and a coupling ring, with the ends of a torsion spring being connected to either the disc or the ring. The torsion spring is a helical spring, preferably composed of a wound spring plate.

15 Claims, 7 Drawing Sheets

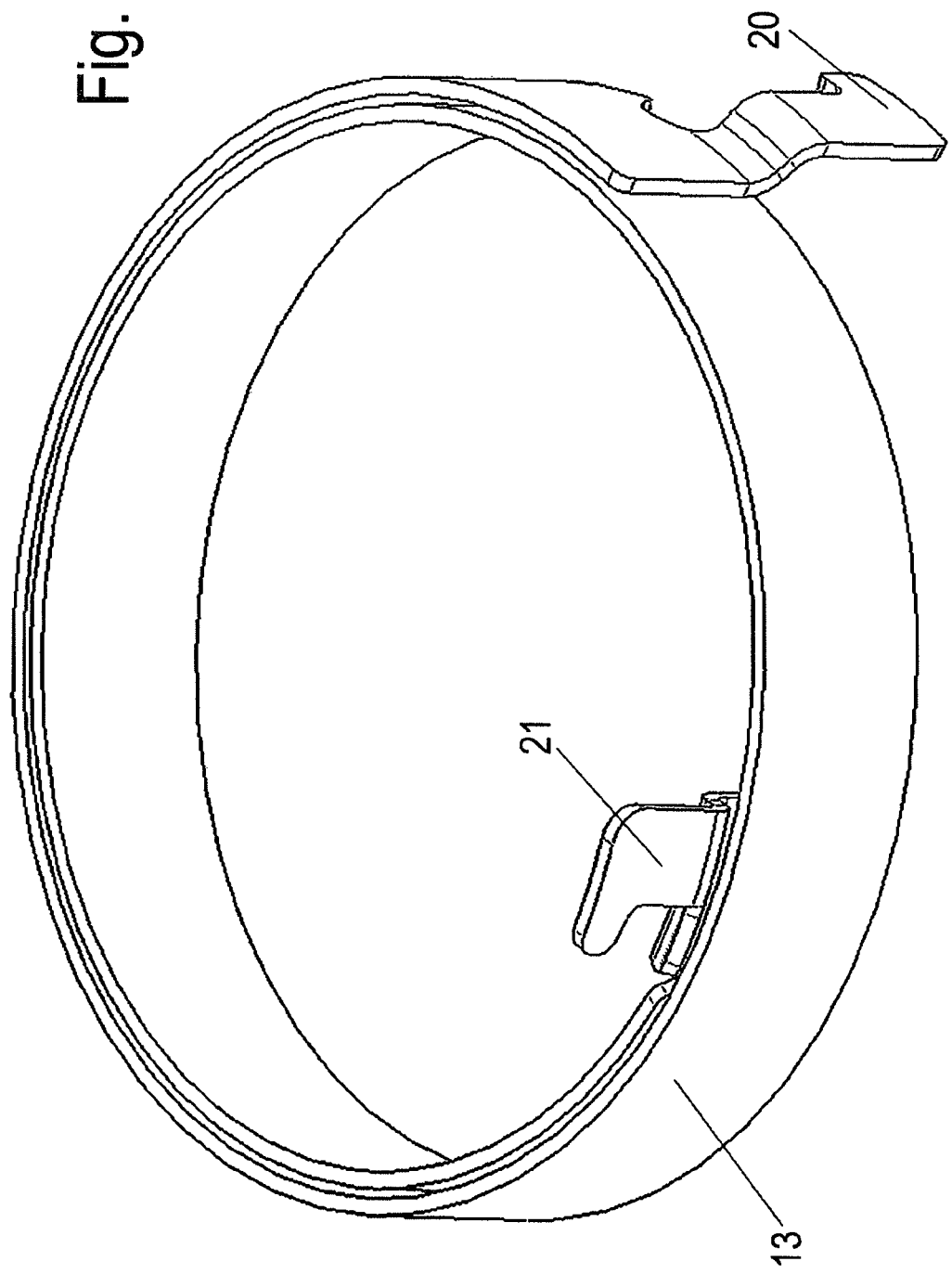

PNEUMATICALLY OR ELECTROMECHANICALLY ACTUATABLE DISC BRAKE

CROSS-REFERENCE TO RELATED APPLICATIONS

This application is a continuation of PCT International Application No. PCT/EP2010/060140, filed Jul. 14, 2010, which claims priority under 35 U.S.C. §119 from German Patent Application No. DE 10 2009 033 394.0, filed Jul. 16, 2009, the entire disclosures of which are herein expressly incorporated by reference.

BACKGROUND AND SUMMARY OF THE INVENTION

The invention relates to a pneumatically or electromechanically actuable disc brake. A disc brake of such type is known from DE 10 2008 036 765, which is not a prior publication.

To achieve a minimization of components, which is always demanded, it is proposed in DE 10 2008 036 765 that the wear adjusting device be arranged between the control spindles and that the adjusting device be operatively connected to the control spindles by way of in central drive input elements of the adjusting device with the interposition of a gearing. In this way, it is possible to dispense with a transmission for the synchronous displacement of the control spindles; in particular, it is possible for functional parts which take up installation space to be arranged outside the region of overlap of the brake lever in the brake caliper, whereas the drive input spindles are guided to the outside through the brake caliper.

In this way, the brake caliper is not only reduced in size from a spatial aspect but also reduced in weight, which likewise meets a set demand. This weight reduction also leads to a reduction in fuel consumption of the vehicle, which constitutes a considerable advantage, both in economic terms and also with regard to a reduction in environmental pollution, over the disc brakes hitherto used.

Among other things, the adjusting device has a ball ramp coupling which, together with a ball cone coupling, forms a coupling that can be switched under load and by which an overload of the adjusting device during a braking process, that is to say when the brake lever is actuated, is prevented, such that the functional capability of the adjusting device is permanently ensured. With regard to the mode of operation of the adjusting device, reference is made to the cited DE 10 2008 036 765, which is not a prior publication.

To obtain fast response behavior of the ball ramp coupling, a torsion spring is provided. The torsion spring is connected at one side to a drive output disc, which engages into the drive input element of the adjusting device, and at the other side to a coupling ring. The drive output disc and coupling ring both are constituent parts of the ball ramp coupling.

Here, the torsion spring has hitherto been designed as a helical spring, that is to say is relatively large both in diameter and also in structural height.

The diameter of the torsion spring co-determines, inter alia, the size of installation openings in the brake caliper, the dimensions of which, in turn, have an influence on the stiffness of the brake caliper.

Since the brake caliper is a highly loaded component, minimizing the provision of openings is a constant aim in the design considerations during the configuration of a disc brake. In this respect, the known disc brake is in need of optimization.

It is an object of the invention to further develop a disc brake of the above-mentioned type such that its functional reliability is improved and its dimensioning is optimized.

This and other objects are achieved according to the invention, by a pneumatically or electromechanically actuable disc brake, in particular for a commercial vehicle, having: a brake caliper which engages over a brake disc; a brake application device, which is arranged in the brake caliper and which has a brake lever, for pressing brake pads against the brake disc; two control spindles which are arranged parallel to and spaced apart from one another and which can be moved axially by the brake application device; and an adjusting device which is positioned in the brake caliper and can be actuated by the brake lever and has a central drive input element and is arranged between the control spindles and is operatively connected to the control spindles via a gearing, with which adjusting device a wear-induced change in an air gap between the brake pad and the brake disc can be substantially compensated by an axial displacement of the control spindles. The central drive input element is connected to a drive input spindle via a ball ramp coupling, and the ball ramp coupling has a drive output disc, which engages into the drive input element, and a coupling ring to which in each case one end of a torsion spring is connected. The torsion spring is formed as a spiral spring.

The present invention advantageously uses a spiral spring as a torsion spring instead of a helical spring, wherein said spiral spring is preferably wound from a spring plate and has hooks or angled portions formed on the ends for fastening to the coupling ring, on the one hand, and to the drive output disc, on the other hand. Here, the drive output disc, which on the outside bears a slotted link toothing which corresponds to a gearing that actuates the control spindles, in effect forms a receptacle for the spiral spring, into which receptacle the coupling ring is recessed.

The spiral spring which is wound from spring plate is dimensioned in terms of its width so as to prevent the spiral spring from becoming jammed in a maximum gap formed between the coupling ring and the drive output disc. This gap arises during an actuation of the ball ramp coupling, during which, as a result of a relative rotation of the coupling ring with respect to the drive output disc, axial spreading between the two components takes place, such that the gap is formed.

It is, however, also contemplated in principle for the spiral spring to be produced from a spring wire, wherein the spiral spring has a significantly lower structural height than a helical spring hitherto used, in the same way as a spiral spring composed of wound spring plate. The low structural height permits a more compact structural height of the adjusting device.

The diameter of the spiral spring may, however, also be reduced in relation to that of a helical spring, in particular if, in the case of the design variant produced from spring plate, the individual windings bear directly against one another.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 shows a detail of the adjusting device according to FIG. 6, likewise illustrated in diagrammatic form.

DETAILED DESCRIPTION OF THE DRAWINGS

Figure 1:
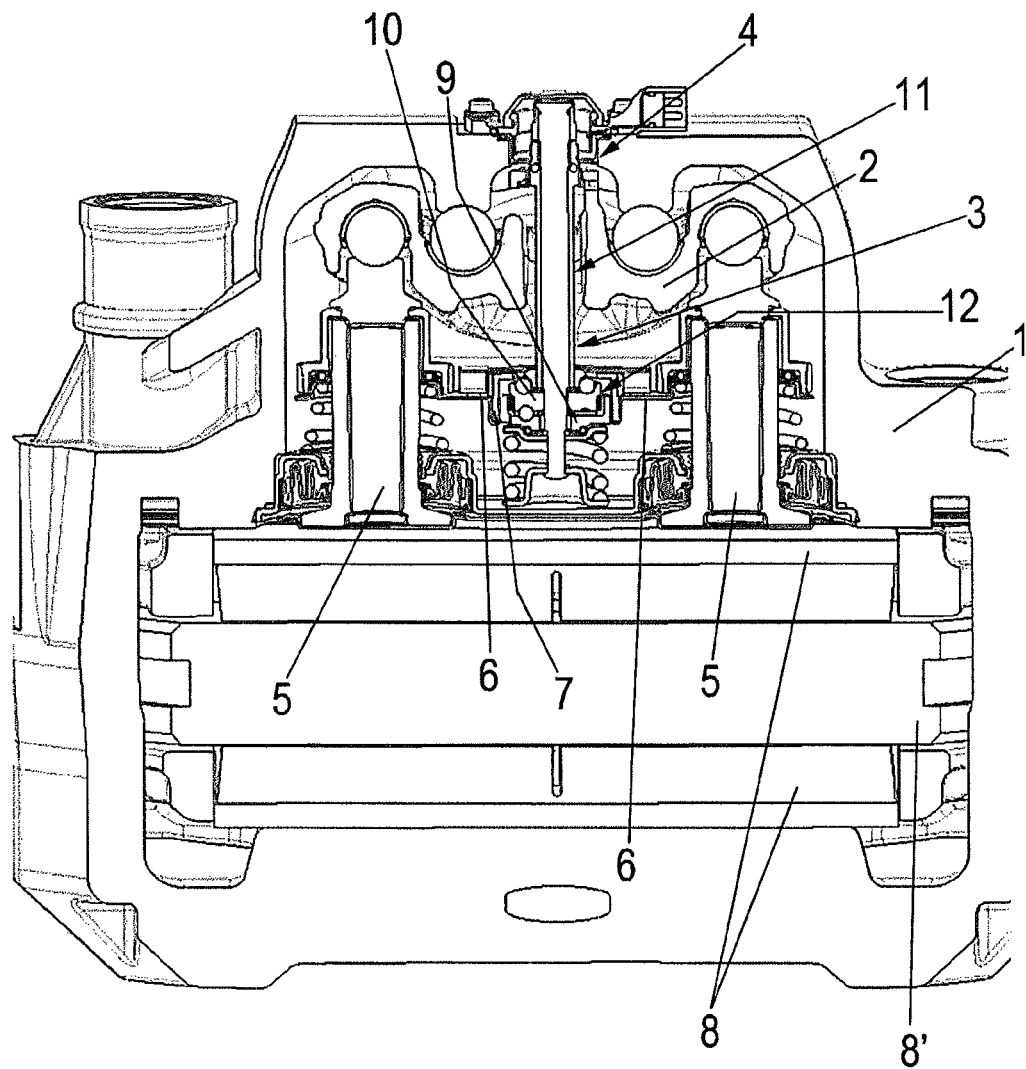
FIG. 1 shows an exemplary disc brake according to the invention in a sectional, schematic plan view.

FIG. 1 illustrates a pneumatically or electromechanically actuable disc brake, in particular for a commercial vehicle, having a brake caliper 1 and a brake application device, which is arranged in the brake caliper. The brake application device includes a brake lever 2, for pressing brake pads 8 against a brake disc 8', wherein two control spindles 5 which are arranged parallel to and spaced apart from one another can be pressed, under axial displacement, against the associated brake pad 8 by way of the brake lever 2.

Arranged in the brake caliper 1 is a wear adjusting device 3, which can be actuated by the brake lever 2 and with which a wear-induced change in an air gap between the brake pad 8 and the brake disc 8' can be substantially compensated via an axial displacement of the control spindles 5.

The adjusting device 3 is arranged between the control spindles 5 and is operatively connected to the latter via a gearing. The gearing is composed of a central drive input element 7 in the form of a toothed wheel which is connected to a drive input spindle 11 for conjoint rotation therewith and which corresponds to two gearwheels 6 which are likewise formed as toothed wheels and which are fastened in each case to the control spindles 5 for conjoint rotation therewith.

During an actuation of the brake, the brake lever 2 performs a pivoting movement which is transmitted via a drive input device 4 into the adjusting device 3 and transferred to the drive input spindle 11.

A ball ramp coupling 12 is provided, as a constituent part of a coupling that can be switched under load, between the drive input spindle 11 and the drive input element 7, which ball ramp coupling has a coupling ring 10 and a drive output disc 9 which is mounted in the drive input element 7 so as to be rotatable over a limited angle of rotation.

For their function, the coupling ring 10 and the drive output disc 9 can rotate relative to one another with a simultaneous change in axial spacing to one another, wherein the drive output disc 9 is pressed against a concentric compression spring 17, which spring 17 is supported in the brake caliper 1.

A switching force to be imparted can be precisely defined by way of the geometric shaping of ramps, which are provided on the sides, which face one another, of the coupling ring 10 and of the drive output disc 9 and on which balls roll so as to axially spread apart the coupling ring 10 and the drive output disc 9, in combination with a spiral spring 13 which functions as a torsion spring.

Figure 5:
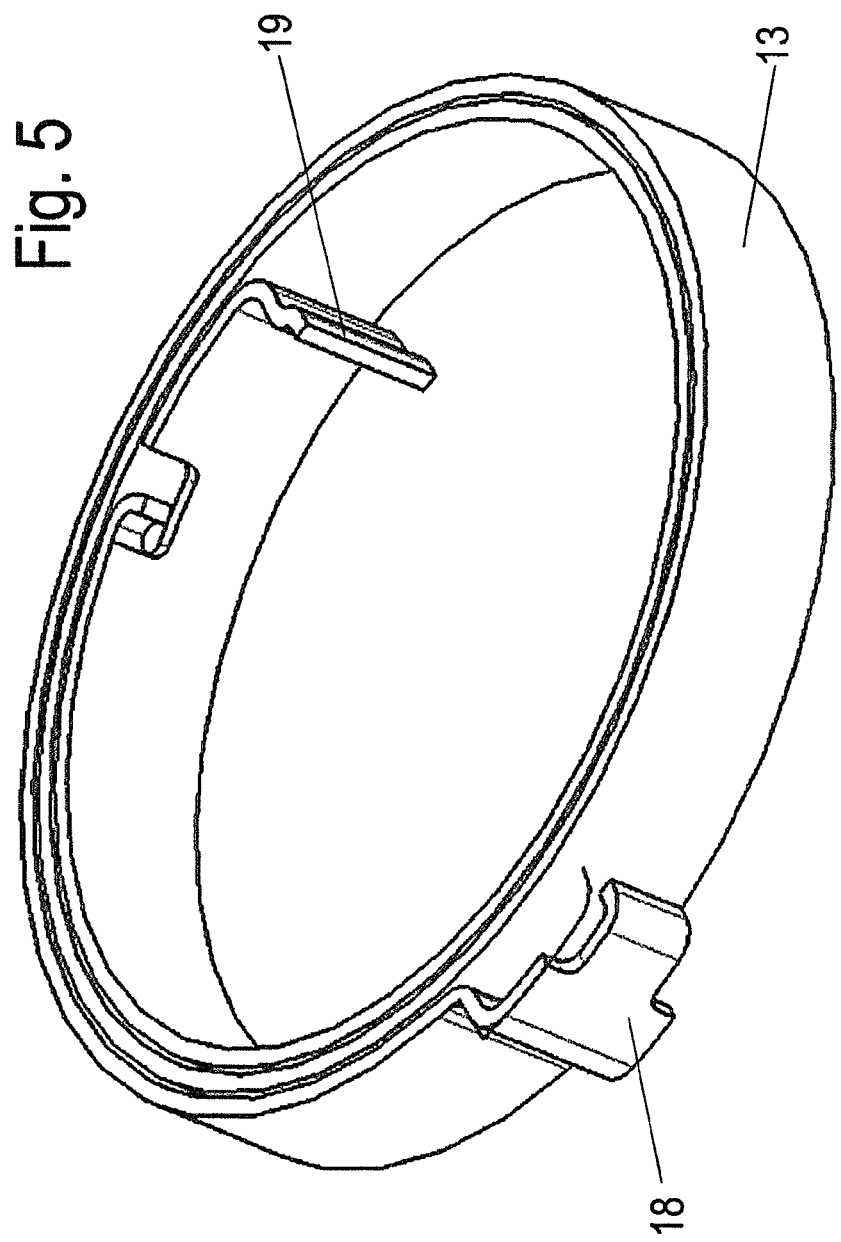
FIG. 5 shows a detail of the adjusting device in a perspective view.

Here, the spiral spring 13, illustrated in detail in FIG. 5, engages in a positively locking manner at one side into the coupling ring 10 and in a positively locking manner at the other side into the drive output disc 9, such that a certain preload force can be set when the balls come into contact with a stop formed in the end region of the ramps.

Figure 4:
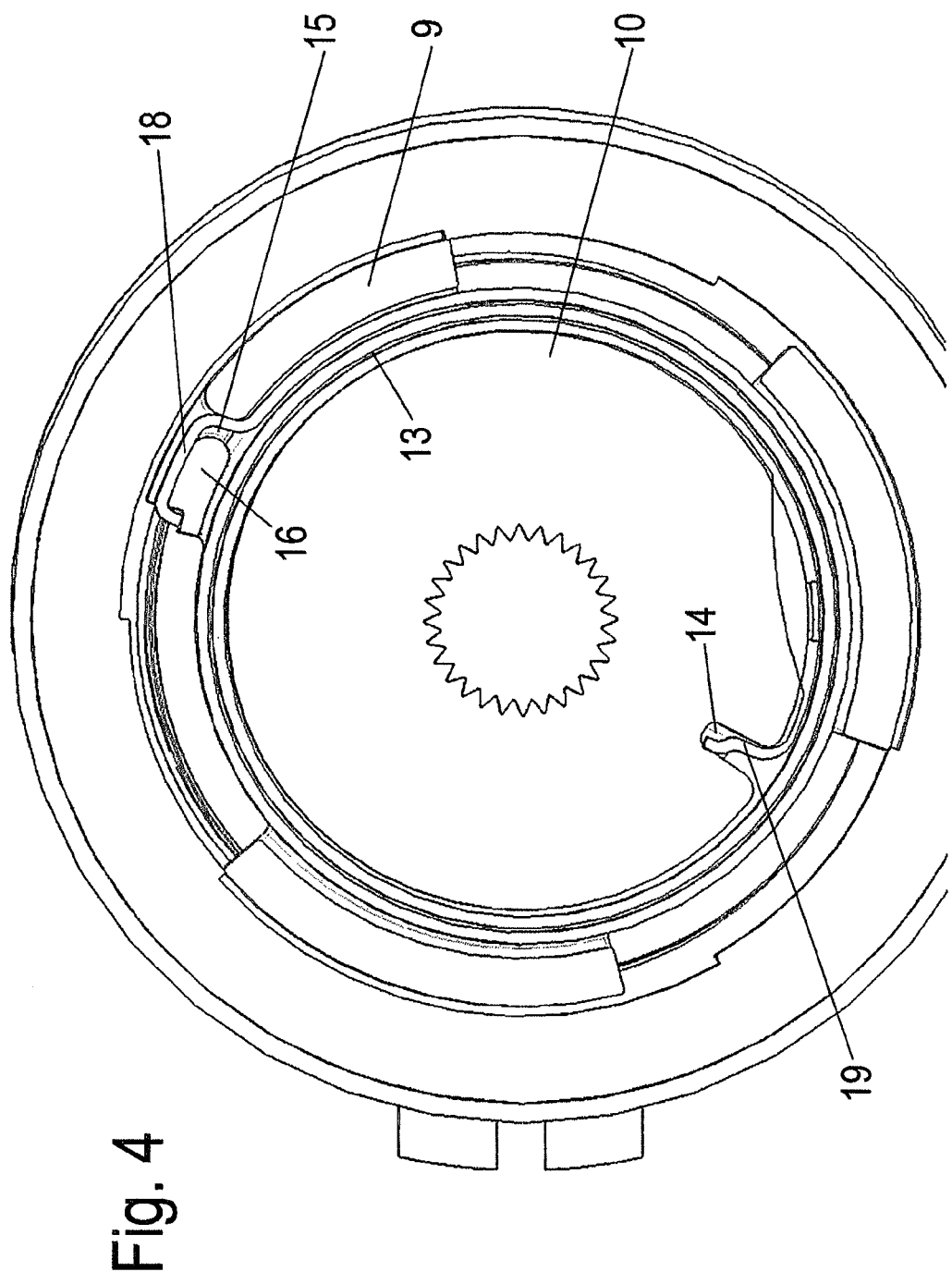
FIG. 4 shows a section view through the adjusting device as per the line IV-IV in FIG. 3.

As is very clearly shown in FIG. 4, the spiral spring 13 is formed, at its end region which engages into the drive output disc 9, as a hook 18 which engages behind a lug 16 and which is guided to the lug 16 through a slot 15.

The coupling ring 10 is provided with a radially extending recess 14, which is open from the outside and into which engages the other, inner and angled end region 19 of the spiral spring 13.

Figure 2:
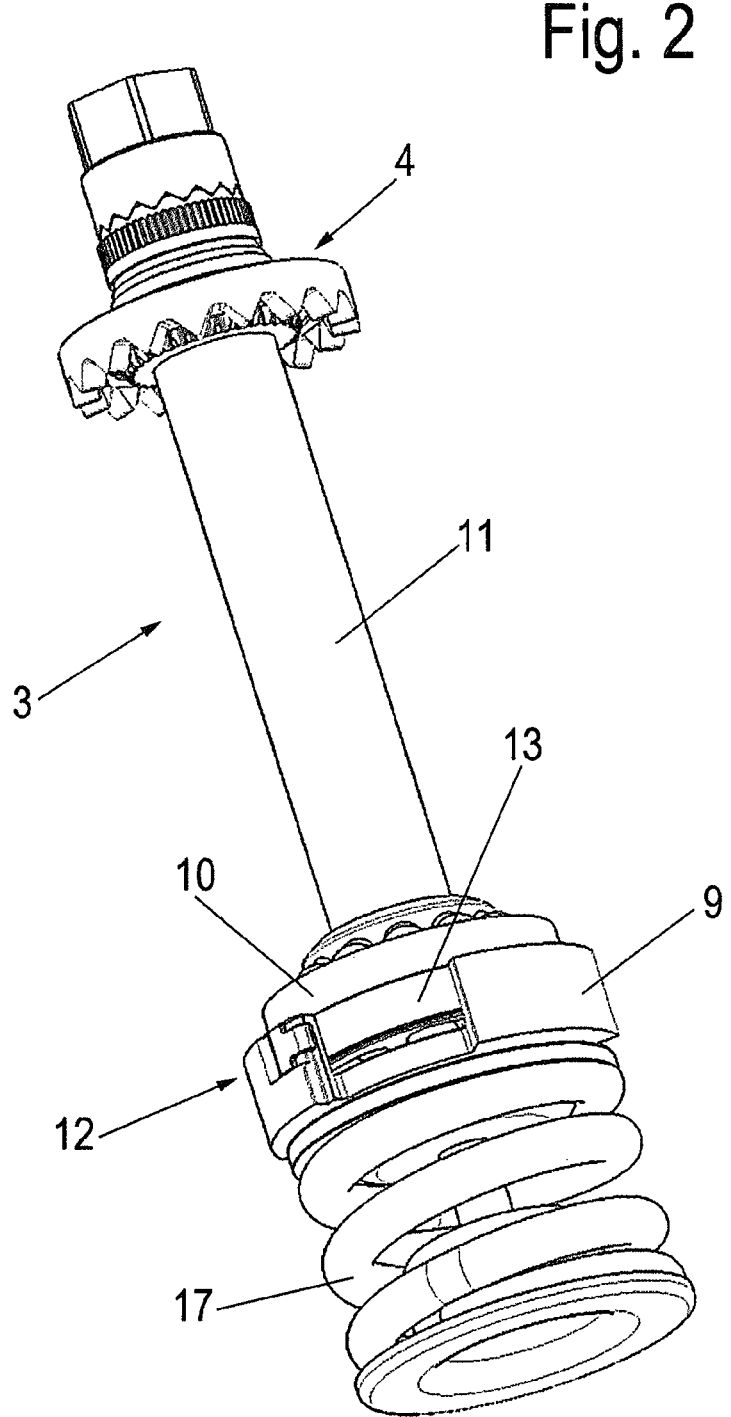
FIG. 2 shows a part of an adjusting device of the disc brake in a perspective view.
Figure 3:
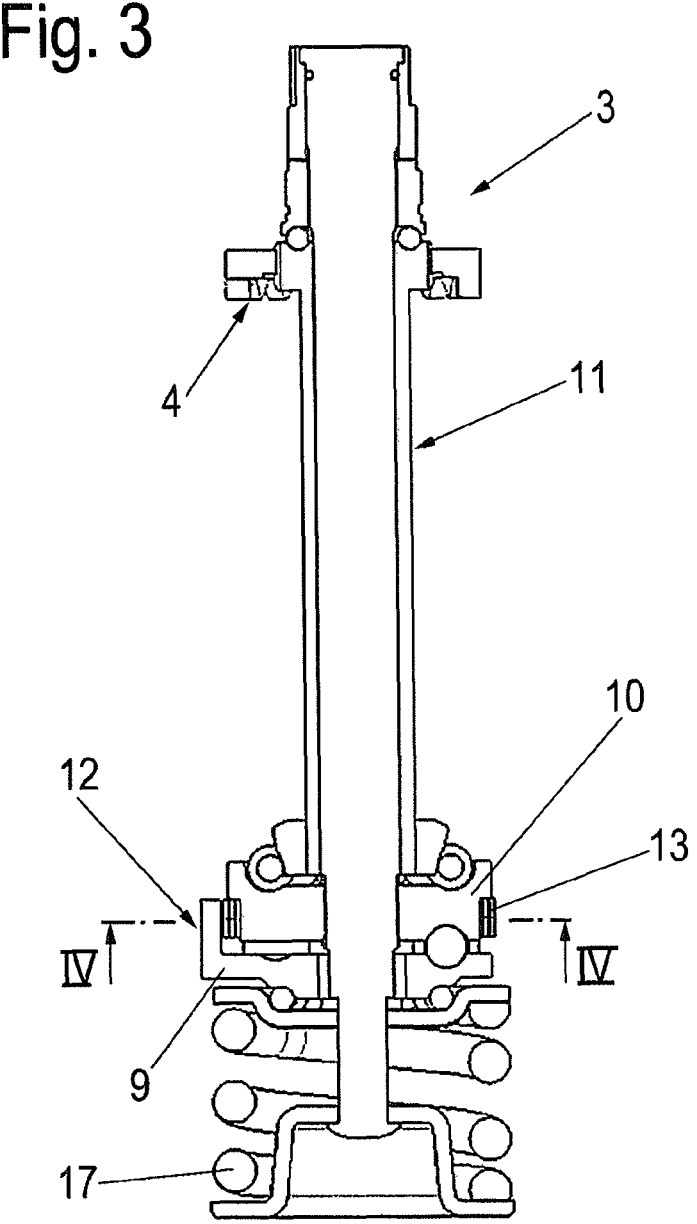
FIG. 3 shows the adjusting device according to FIG. 2 in a longitudinal section view.

As can be seen in particular in FIGS. 2 and 3, the coupling ring 10 is partially recessed into the drive output disc 9, wherein the spiral spring 13, which in the example is wound from a spring plate, is positioned between the walls, which face toward one another, of the coupling ring 10 and of the drive output disc 9. Since the windings of the spiral spring 13 are in contact, only a small amount of space is required, specifically both in the radial direction and also in the axial direction. It is therefore possible for the entire adjusting device 3 to be of extremely compact design. Furthermore, the ball ramp coupling can be assembled merely by being simply plugged together, such that it is possible to dispense with additional machining, which naturally results in a reduction in costs.

Figure 6:
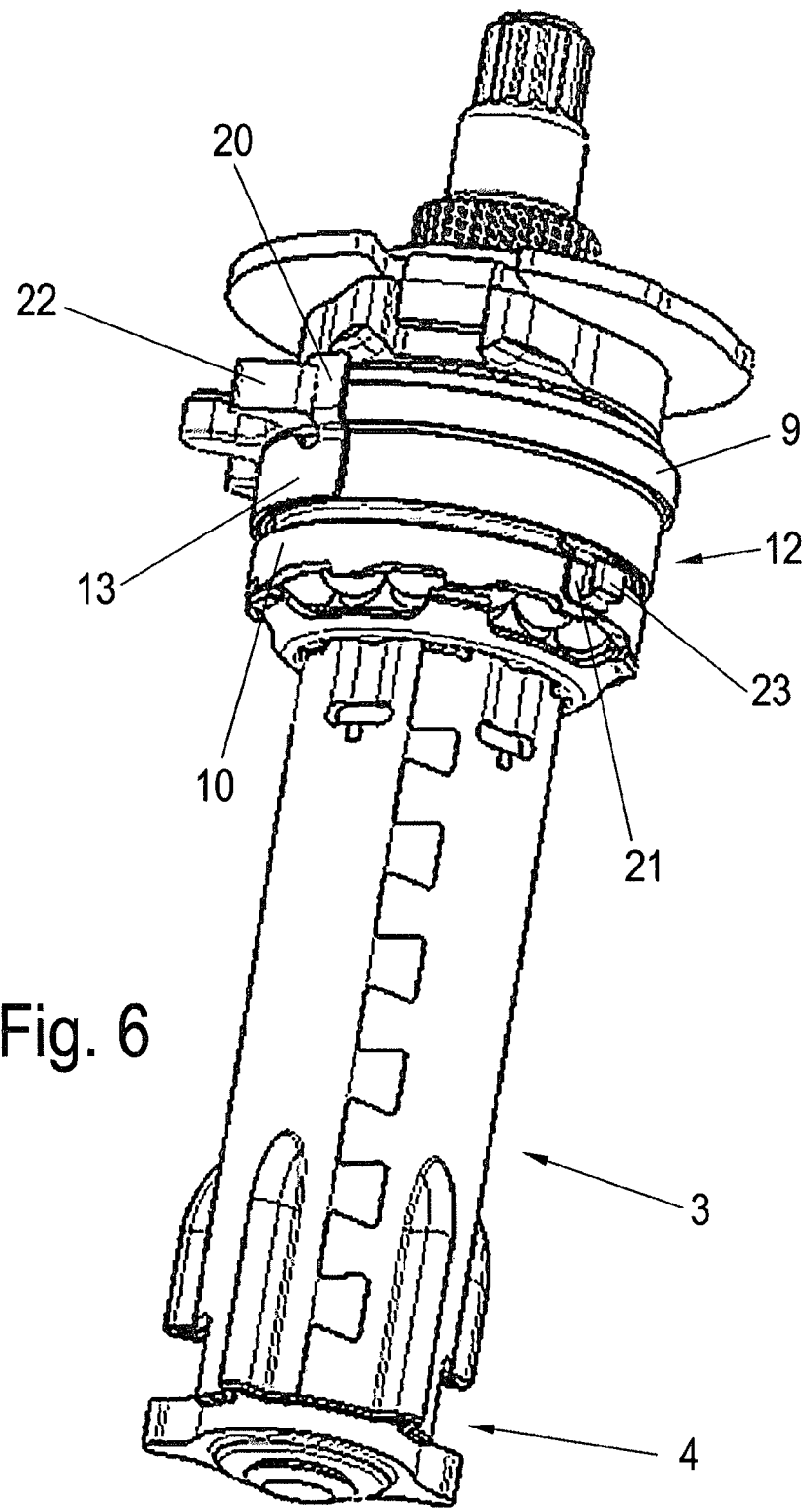
FIG. 6 shows a further exemplary embodiment of an adjusting device of the disc brake in a perspective view.

A further exemplary embodiment of the spiral spring 13 is illustrated in FIGS. 6 and 7.

Here, the end of the outer winding of the spiral spring 13 is formed as an axially projecting hook 20 which, as can be very clearly seen in FIG. 6, bears against a radially protruding projection 22 of the drive output disc 9.

The inner winding of the spiral spring 13 is likewise formed, in its end region, as a hook 21, which extends axially in the opposite direction to the hook 20 and which bears against a radially projecting peg 23 of the coupling ring 10, wherein the contact is such that the spiral spring 13 is stressed in the event of a rotation of the coupling ring 10 and of the drive output disc 9 in opposite directions.

| Table of Reference Numerals | |
|---|---|
| 1 | Brake caliper |
| 2 | Brake lever |
| 3 | Adjusting device |
| 4 | Drive input device |
| 5 | Control spindle |
| 6 | Gearwheel |
| 7 | Drive input element |
| 8 | Brake pad |
| 8' | Brake disc |
| 9 | Drive output disc |
| 10 | Coupling ring |
| 11 | Drive input spindle |
| 12 | Ball ramp coupling |
| 13 | Spiral spring |
| 14 | Recess |
| 15 | Slot |
| 16 | Lug |
| 17 | Compression spring |
| 18 | Hook |
| 19 | End region |
| 20 | Hook |
| 21 | Hook |
| 22 | Projection |
| 23 | Peg |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, comprising:
a caliper operatively configured to straddle the brake disc;

a brake application device arranged in the caliper, the brake application device comprising a brake lever and two control spindles, the control spindles being arranged parallel to and spaced apart from one another and being moveable axially via the brake lever to press brake pads against the brake disc; and a wear adjusting device operatively arranged in the caliper between the two control spindles and being operatively connected to the control spindles via a gearing, the adjusting device being actuable via the brake lever in order to compensate for wear-induced changes in an air gap between the brake pad and the brake disc by axially displacing the two control spindles;

wherein the adjusting device comprises a central drive input element coupled to a drive input spindle via a ball ramp coupling, the ball ramp coupling having a drive output disc, which engages into the drive input element, and a coupling ring, a torsion spring comprising a spiral spring has one end connected to the drive output disc and the other element connected to the coupling ring.

2. The disc brake according to claim 1, wherein the spiral spring is formed of a wound spring plate.

3. The disc brake according to claim 1, wherein the spiral spring is formed of a spring wire.

4. The disc brake according to claim 1, wherein the spiral spring engages in a positively locking manner into the drive output disc and the coupling ring.

5. The disc brake according to claim 1, wherein the spiral spring comprises an angled end region on an end of an inner winding, the angled end region engaging into a radial recess of the coupling ring.

6. The disc brake according to claim 5, wherein an end region of an outer winding of the spiral spring comprises a hook.

7. The disc brake according to claim 1, wherein an end region of an outer winding of the spiral spring comprises a hook.

8. The disc brake according to claim 7, wherein an end region of an inner winding of the spiral spring comprises a hook.

9. The disc brake according to claim 8, wherein the hook of the inner winding of the spiral spring and the hook of the outer winding extend in opposite directions.

10. The disc brake according to claim 9, wherein the hook of the outer winding bears against a radially running peg on the coupling ring and the hook on the inner winding bears against a radial projection of the drive output disc.

11. The disc brake according to claim 6, wherein the drive output disc comprises a slot adjoined by a lug, an angle of the hook on the outer winding engaging behind the lug after the angle has passed through the slot.

12. The disc brake according to claim 1, wherein a width of the spiral spring formed from a spring plate is greater than a gap formed between the drive output disc and the coupling ring in a maximum axial spread.

13. The disc brake according to claim 1, wherein the coupling ring is recessed into the drive output disc at least in an overlapping region with the spiral spring.

14. The disc brake according to claim 1, wherein the disc brake is a pneumatically or electromechanically actuable disc brake.

15. The disc brake according to claim 14, wherein the disc brake is a commercial vehicle disc brake.

* * * * *